United States Patent [19]

Imai

[11] Patent Number: 5,036,338

[45] Date of Patent: Jul. 30, 1991

[54] PRINTING HEAD DRIVE APPARATUS WITH INERTIA CONTROL

[75] Inventor: Saburo Imai, Tokyo, Japan

[73] Assignee: Seiko Instruments Inc., Japan

[21] Appl. No.: 415,124

[22] Filed: Sep. 29, 1989

[30] Foreign Application Priority Data

Sep. 30, 1988 [JP] Japan ................................ 63-246569

[51] Int. Cl.[5] ............................................ G01D 15/10

[52] U.S. Cl. ................................ 346/76 PH; 400/120

[58] Field of Search ...................... 346/76 PH, 139 R; 400/120

[56] References Cited

U.S. PATENT DOCUMENTS 4,684,960 8/1987 Nishiwaki ...................... 346/76 PH 4,911,566 3/1990 Imaseki et al. ...................... 400/120

FOREIGN PATENT DOCUMENTS 0153859 4/1985 European Pat. Off. .

58-31786 2/1983 Japan .

0164877 7/1986 Japan .............................. 346/76 PH 0094371 4/1987 Japan .............................. 346/76 PH 0270346 11/1987 Japan .............................. 346/76 PH

*Primary Examiner*—Benjamin R. Fuller

*Assistant Examiner*—Huan Tran

*Attorney, Agent, or Firm*—Bruce L. Adams; Van C. Wilks

[57] ABSTRACT

In a thermal color hard copy machine in which only one reversible motor is used for both driving a paper feed mechanism and a printing head driving mechanism for lifting and lowering a printing head thereof relative to a platen, the inertia of the printing head driving mechanism is precisely controlled by an inertia control device. In particular, this inertia control device controls the inertia of a one-way power transmission device generally provided in this type of printing head driving mechanism for precisely stopping the printing head at a predetermined position relative to the platen.

20 Claims, 3 Drawing Sheets

PRINTING HEAD DRIVE APPARATUS WITH INERTIA CONTROL

BACKGROUND OF THE INVENTION

The present invention relates to thermal color printers, and more particularly to a printing head drive thereof.

In a conventional thermal color printer, four separate driving motors are used for driving an ink sheet feed mechanism, a printing paper feed mechanism and a printing head drive mechanism for lifting and lowering the printing head relative to a platen facing the printing head. The color printer of this type basically has a printing paper feed mechanism which is comprised of a paper feed roller, a printing head and a platen facing one another, and a capstan; and an ink sheet feed mechanism which feeds an ink sheet sequentially coated in the printing direction with the primary colors.

In the first forward pass, a printing paper superposed on an ink sheet passes between the platen and the printing head under pressure to thermally print a first color ink thereon. Then the printing paper printed in the first color ink is fed backward for the second forward pass for printing the second color ink thereon. When the third forward pass for printing the third color ink is finished, one printing operation of a full color print is completed. During each backward feeding operation, the ink sheet is wound for the print of the subsequent color, and the print head is temporarily separated from the platen.

Two out of the four motors are used for the printing paper feed mechanism, and the other two separate driving motors are used for the ink sheet feed mechanism and the printing head drive mechanism. Four separate motors take up a large space in a limited installation space within a thermal color printer. Consequently, this imposes a limitation on the miniaturization of thermal color printers. In order to eliminate this limitation and lower the cost of a color thermal printer of this type, an improved thermal color printer was proposed in which only one reversible motor is used for both driving the paper feed mechanism and the printing head drive mechanism. In this improved thermal color printer, one rotational direction of the reversible motor is applied to the up/down movement of the printer head relative to the platen, and the reverse rotational direction thereof is applied to driving of the ink sheet feed mechanism, and viceversa. When the motor is driven in one direction to transmit power to either the ink sheet feed mechanism or the printing head drive mechanism, power transmission to the other is cut by a one-way clutch or a one-way power transfer mechanism installed between the motor and the respective ink sheet feed mechanism and printing head drive mechanism.

Precise control of the printing head drive mechanism is required in order to stop and start the operation of lifting and lowering the printing head relative to the platen. In particular, the printing head drive mechanism has to be stopped precisely in order to provide a proper contact of the printing head with the top surface of the platen for an optimum printing. However, this one-way clutch or one-way power transfer mechanism has a substantially large inertia. This inertia is very difficult to control, and without control of the inertia, the printing head drive mechanism overruns due to the inertia of the one-way clutch. Further, conditions of controlling the printing head drive mechanism, such as switching on and off of the motor, had to be decided based on experiments, which likely renders the control unreliable.

SUMMARY OF THE INVENTION

It is therefore an object of the present invention to solve the problem described in the foregoing paragraph. It is another object of the present invention to provide a control mechanism for controlling the inertia of the printing head drive mechanism in a thermal color printer. It is still another object of the invention to provide a printing head drive mechanism which is operated by a reversible motor and a one-way clutch mechanism and has a control mechanism for controlling the inertia of the printing head drive mechanism in the thermal color printer.

DETAILED DESCRIPTION OF PREFERRED EMBODIMENTS

Figure 2:
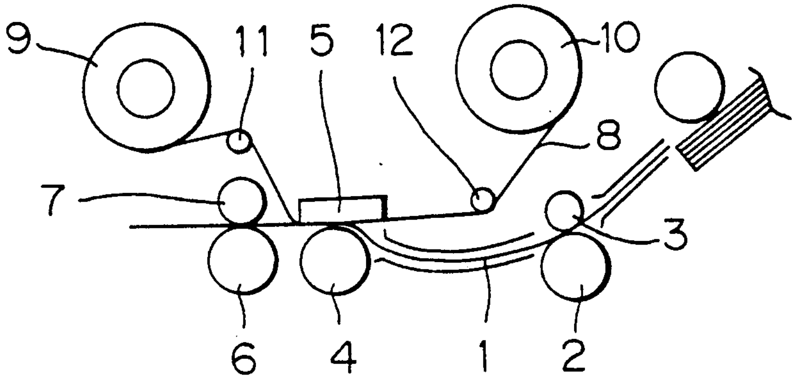
FIG. 2 is a schematic side elevation of a thermal color printer which has the printing head drive shown in FIG. 1.

The present invention is hereunder described with reference to the accompanying drawings. In FIG. 2, a paper feed mechanism for feeding a printing paper 1 is provided, from the upstream to the downstream, with a paper feed roller 2, a pinch roller 3, a platen 4, a printing head 5, a capstan 6, and a pinch roller 7. A mechanism of supplying an ink sheet 8 comprises a rewinding bobbin 9, an unwinding bobbin 10, and guide rollers 11 and 12. Although not shown in the figure, these rollers are driven by a reversible motor. The printing head 5 is brought into contact with the platen 4 under pressure when the paper is forward fed, and thermally prints an image on the paper. The printing head 5 is separated from the platen 4 during which the paper is fed backward and the ink sheet 8 is forwarded for the following pass.

Figure 1:
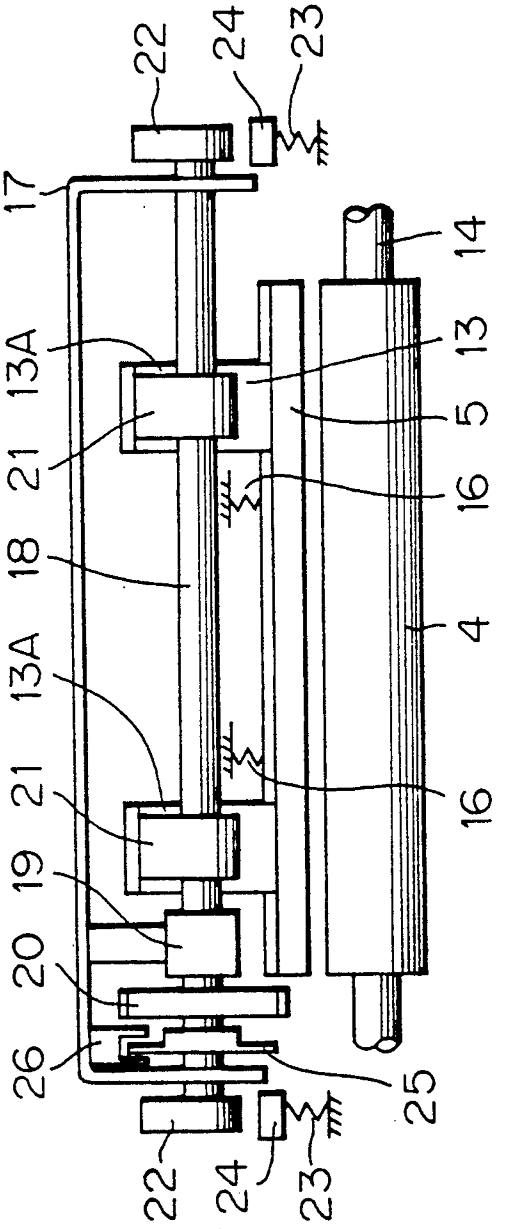
FIG. 1 is a front view of an embodiment of the printing head drive mechanism according to the present invention.

FIG. 1 is a front view of the printing head according to the present invention. The printing head 5 is arranged in a position facing the platen 4. The printing head 5 is supported by a supporting member 13 so that it is vertically movable in a direct on perpendicular to a shaft 14 of the platen 4. The supporting member 13 is rotatably attached to a shaft 15 which is provided parallel to the platen shaft 14 as shown in FIGS. 3 and 4. The supporting member 13 is urged by a pair of elastic members 16 toward the platen shaft 14. A printing head drive shaft 18 rotatably supported at both ends thereof by a printer frame 17 is connected to a reversible motor (not shown) via a one-way clutch 19 and a drive gear 20. The drive shaft 18 is securely provided with a pair of driving cams 21 such as eccentric cams. These cams 21 are arranged in a direction extending upward from the supporting member 13. They are also arranged on a pair of square flanges 13A so that they are brought into contact with the flanges 13A. Both ends of the drive shaft 18 are securely provided with a pair of braking cams 22 such as eccentric cams in the counter position relative to the driving cams 21. Towards the bottom of these cams 22, a pair of stoppers 24 supported by springs 23 are provided in the manner that they are brought into contact with the cams 22. Further, the driving shaft 18 is provided with a semicircular plate 25 for detecting the rotation angle of the driving cams 21. The rotational angle of the semicircular plate 25 is optically detected by a sensor 26.

Figure 3A:
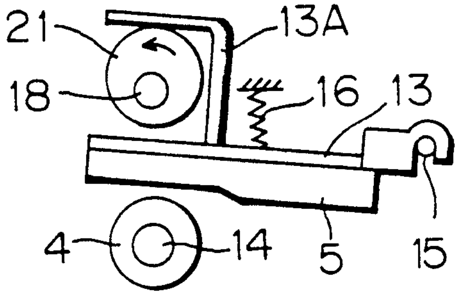
FIGS. 3 (A)-(C) and FIGS. 4 (A)-(C) schematically show the operation of a printing head drive mechanism shown in FIG. 1.
Figure 3B:
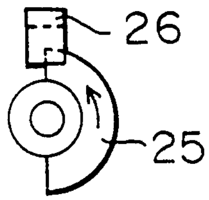
Figure 3C:
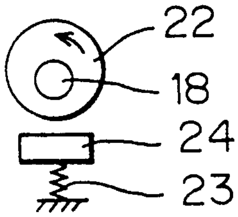

FIGS. 3 and 4 explain the operation of the printing head drive mechanism according to the present invention. FIG. 3 shows one operation stage when the printing head 5 is being held at a lifting position while spaced at a predetermined separation relative to the platen 4. FIG. 4 shows another operation stage when the printing head 5 is held at a lowering position while brought into contact with the platen 4. In FIG. 3(A), the driving cams 21 are rotated at a rotation angle as shown in the figure by the one-way rotation force (see the arrow) transferred via the one-way clutch from the reversible motor. The driving cams 21 press, against the elastic member 16, the flanges 13A provided extending from the supporting member 13 so that the printing head 5 moves to the lifting position. During this pressing stroke, the cams 21 are brought to a stopping position immediately before reaching an upper dead point to allow the printing head 5 to be accurately positioned. As shown in FIG. 3(B), the angular position immediately before the upper dead point is detected by the combination of the semicircular plate 25 with the optical sensor 26, and it is at this moment that the motor stops rotating. As shown in FIG. 3(C), the braking cams 22 arranged in antiphase relative to the driving cams 21 are not yet engaged with the stoppers 24 at this moment, whereby no braking force is applied to the drive shaft 18.

Figure 4A:
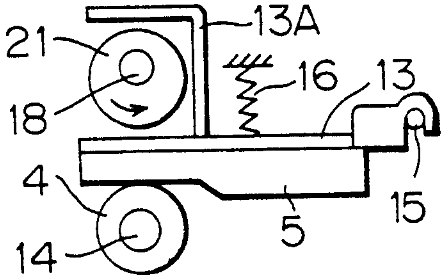
Figure 4B:
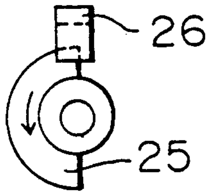

FIG. 4(A) shows the driving cams 21 being in the releasing stroke. If the same one-way rotation force (see the arrow) of the reversible motor is transferred via the one-way clutch to the driving cams 21 which have been in a position immediately before reaching the upper dead point, the driving cams 21 rotate at a predetermined rotation angle, and they are disengaged with the flanges 13A. As a result, the supporting member 13 is caused to rotate around the shaft 15 by being urged by the elastic member 16, and the printing head 5 is brought into contact with the platen 4 under pressure. The rotation angle of the driving cams when the printing head 5 is in contact with the platen is detected by the combination of the semicircular plate 25 with the optical sensor 26 as shown in FIG. 4(B), and it is at this moment that the motor stops rotating.

Figure 4C:
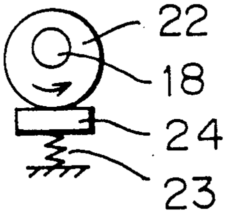

As shown in FIG. 4(C), the braking cams are in contact with the stoppers 24 in the above mentioned stroke t prevent the drive shaft 18 from rotating due to inertia. If there is no braking provided, the drive shaft 18 would overrun because it is connected to the one-way clutch and would result in causing an error to the rotation angle of the driving cams.

Figure 5:
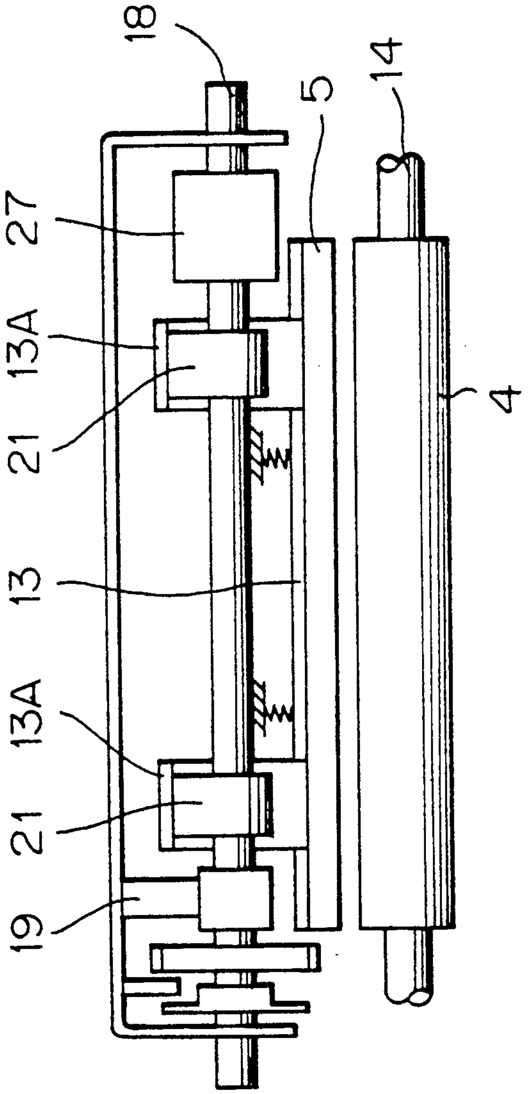
FIG. 5 is a schematic front view of another embodiment of the printing head drive mechanism according to the present invention.

FIG. 5 schematically shows another embodiment of the printing head drive mechanism according to the present invention. In this embodiment, a torque limiter 27 such as a magnetic powder limiter is used instead of the combination of the braking cams with the stoppers to prevent overrunning of the drive shaft. The torque limiter 27 prevents overrunning or idle running of the drive shaft by limiting the torque of the drive shaft.

What is claimed is:

1. A color hard copy printer comprising: a printing head; ink sheet feeding means for feeding an ink sheet; printing paper feeding means for feeding printing paper; printing head driving means for driving said printing head toward and away from the ink sheet, said printing head driving means comprising a rotary cam, a one-way clutch connected to rotationally drive the cam, and a printing head support member supporting thereon said printing head and rotatable around a printing head drive shaft; a platen facing said printing head and having a platen shaft arranged in parallel with said printing head drive shaft; printing head lifting means including said rotary cam and one-way clutch and coacting with said printing head support member for moving said printing head around said printing head drive shaft in a direction perpendicular relative to the top surface of said platen between a first position where said printing head is in contact with the top surface of said platen under a predetermined pressure for printing and a second position where said printing head is spaced apart at a predetermined interval from the top surface of said platen, said printing head lifting means including a cam shaft having said rotary cam connected thereto, and a cam member connected to said printing head support member and engageable with said cam; motor driving means for driving said ink sheet feeding means, said printing paper feeding means and said printing head driving means; and inertia control means for braking the rotation of the cam to thereby control the inertia of said printing head driving means, said inertia control means comprising at least one braking cam means secured to said cam shaft for stopping the rotation of said cam shaft at a predetermined angle of rotation of said cam shaft.

2. A color hard copy printer according to claim 1, further comprising detection means for detecting the angle of rotation of said cam shaft for controlling the rotational movement thereof.

3. A color hard copy printer according to claim 1; wherein said inertia control means includes means for controlling the movement of said printing head lifting means for providing a predetermined printing pressure when said printing head is in contact with the top surface of said platen.

4. A color hard copy printer according to claim 1; wherein said ink sheet feeding means and printing head driving means are driven by a single reversible motor connected to said one-way clutch.

5. A printer comprising:

a rotatable platen:

printing means movable to a printing position adjacent to the platen and to a non-printing position spaced from the platen;

ink sheet feeding means operative when driven for feeding an ink sheet over the platen, the ink sheet containing at least one transferable coloring material;

printing paper feeding means for feeding printing paper over the platen between the ink sheet and the platen;

driving means connected to a power supply for selectively driving the printing means between the printing and non-printing positions and for selectively driving the ink sheet feeding means, the driving means comprising a rotary driving cam engageable with the printing means to displace the same to the non-printing position and disengageable from the printing means to enable the same to be displaced to the printing position, and rotating means for rotating the driving cam;

detecting means for detecting predetermined rotary positions of the driving cam and effecting disconnection of the power supply from the driving means when the driving cam reaches the predetermined rotary positions whereby the driving means momentarily continues to drive the printing means under its own inertia after the power supply has been disconnected; and inertia control means for controlling the inertia of the driving means after the power has been disconnected, the inertia control means including a braking cam connected to the rotating means to rotate therewith for braking the rotation of the rotating means after the driving cam reaches one of the predetermined rotary positions during displacement of the printing means to the printing position.

6. A printer according to claim 5; wherein the ink sheet feeding means comprises rotatable guide rollers for moving the ink sheet over the platen, and at least one reversible motor for rotating the guide rollers.

7. A printer according to claim 5; wherein the printing paper feeding means comprises rotatable feed rollers for feeding the printing paper to the platen and for removing the printing paper from the platen after the printing head reaches the non-printing position, and a reversible motor for rotating the feed rollers.

8. A printer according to claim 5; wherein the driving means includes biasing means for elastically biasing the printing head from the non-printing position to the printing position when the driving cam is disengaged from the printing means.

9. A printer according to claim 8; wherein the biasing means includes at least one elastic member.

10. A printer according to claim 5, wherein the rotating means comprises a rotatable cam shaft for rotating the driving cam, a reversible motor rotatable in forward and reverse directions, and connecting means for selectively connecting the reversible motor to the cam shaft and the ink sheet feeding means whereby rotation of the motor in the forward direction drives the cam shaft and in the reverse direction drives the ink sheet feeding means.

11. A printer according to claim 10; wherein the connecting means comprises clutching means for alternately clutching the reversible motor to the cam shaft and ink sheet feeding means.

12. A printer according to claim 11; wherein the clutching means comprises at least a one one-way clutch to releasably clutch the reversible motor to one of the cam shaft and the ink sheet feeding means.

13. A printer according to claim 11; wherein the clutching means comprises two one-way clutches to releasably clutch the motor to the cam shaft and the ink sheet feeding means, respectively.

14. A printer according to claim 5; wherein the detecting means comprises a plate member connected to rotate synchronously with the driving cam, and an optical detector for optically detecting predetermined rotary positions of the plate member corresponding to the predetermined rotary positions of the driving cam.

15. A printer according to claim 14; wherein the plate member comprises a semi-circular plate.

16. A printer according to claim 5; wherein the inertia control means comprises biasing means for elastically biasing the braking cam against a stopper to brake the rotation of the rotating means.

17. A printer according to claim 16; wherein the biasing means comprises a spring connected to the stopper such that when the braking cam rotates against the stopper the force of the spring urges the stopper against the braking cam.

18. A printer according to claim 5; wherein the printing means comprises a thermal print head.

19. A color hard copy printer comprising: a printing head; ink sheet feeding means for feeding an ink sheet; printing paper feeding means for feeding printing paper; printing head driving means for driving said printing head toward and away from the ink sheet, said printing head driving means comprising a rotary cam, a one-way clutch connected to rotationally drive the cam, and a printing head support member supporting thereon said printing head and rotatable around a printing head drive shaft; a platen facing said printing head and having a platen shaft arranged in parallel with said printing head drive shaft; printing head lifting means including said rotary cam and one-way clutch and coacting with said printing head support member for moving said printing head around said printing head drive shaft in a direction perpendicular relative to the top surface of said platen between a first position where said printing head is in contact with the top surface of said platen under a predetermined pressure for printing and a second position where said printing head is spaced apart at a predetermined interval from the top surface of said platen, said printing head lifting means including a cam shaft having said rotary cam connected thereto, and a cam member connected to said printing head support member and engageable with said cam; motor driving means for driving said ink sheet feeding means, said printing paper feeding means and said printing head driving means; and inertia control means for braking the rotation of the cam to thereby control the inertia of said printing head driving means, said inertia control means comprises a torque limiter mounted on said cam shaft for restricting the rotational movement of said cam shaft in order to stop said cam shaft at a predetermined rotation angle thereof.

20. A color hard copy printer according to claim 19; wherein said torque limiter comprises a magnetic powder torque limiter.

* * * * *